H. HAYMAN.
SPRING WHEEL.
APPLICATION FILED MAY 5, 1920.

1,386,927.

Patented Aug. 9, 1921.

Witness
G.H.Hauk.

Inventor
Harry Hayman
By Stuart E. Barnes
Attorney

UNITED STATES PATENT OFFICE.

HARRY HAYMAN, OF DETROIT, MICHIGAN.

SPRING-WHEEL.

1,386,927. Specification of Letters Patent. Patented Aug. 9, 1921.

Application filed May 5, 1920. Serial No. 378,961.

*To all whom it may concern:*

Be it known that I, HARRY HAYMAN, a citizen of Russia, residing at Detroit, in the county of Wayne and State of Michigan, have invented certain new and useful Improvements in Spring-Wheels, of which the following is a specification.

This invention relates to spring wheels, and has for its object devices by which an ordinary spoke wheel may be converted into a spring wheel by sawing out portions of the spokes and placing therebetween the spring devices that I have designed for the purpose. There are a good many spring wheels that have heretofore been designed but very few of them have ever gone into use and none of them into extensive use. There have been several designs of cushion wheels with rubber interposed between the hub and the rim of the wheel which found considerable favor for trucks. Wheels of this description, however, have been very expensive. It is the object of the present invention to provide devices that can be had at the accessory stores and with which any standard wheel can be converted into a wheel cushioned between the rim and the hub. This transformation may be readily made by one who is not a skilled artisan. This will more fully appear from the description which follows.

In the drawings,—

Figure 1:
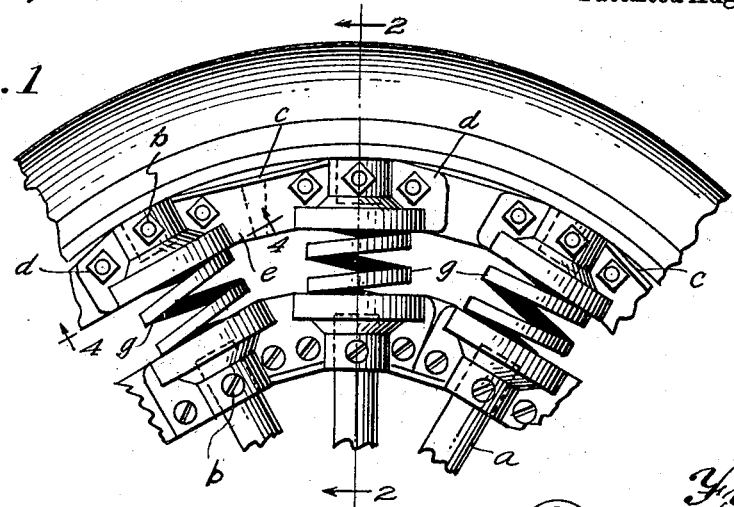
Figure 1 is a fragmentary view of a wheel equipped with my spring inserts.
Figure 5:
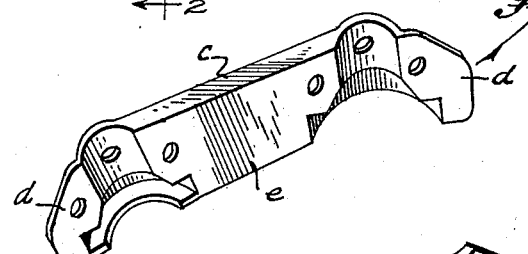
Fig. 5 is a perspective of the inside of one of the plates forming one of the sections of the sectional ring.
Figure 2:
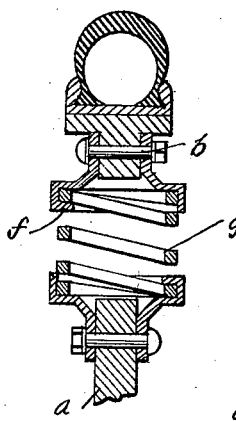
Fig. 2 is a section on the line 2—2 of Fig. 1.
Figure 3:
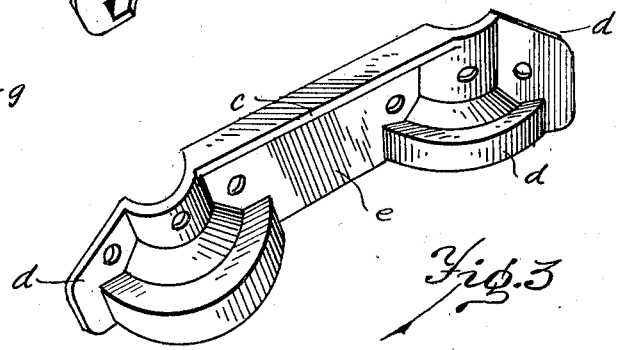
Fig. 3 is a perspective of one of the plates which goes to form the sectional outer or inner ring and spring seats.
Figure 4:
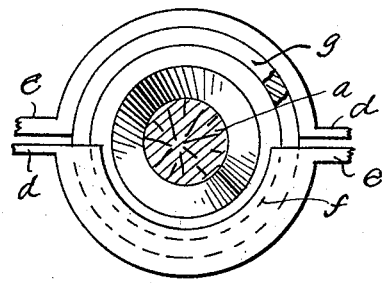
Fig. 4 is a section taken on the line 4—4 of Fig. 1.

The spokes $a$ can be cut out as shown in Fig. 1. It is not absolutely necessary that the cut-out portion of all the spokes be absolutely uniform but it is desirable to have the spacing of the bolt holes for the bolts $b$ that pass through the ends of the spokes located at uniform radial distances in all the spokes. I provide a plurality of castings $c$, one of which is portrayed in Fig. 3. These castings comprise a pair of half spring seats and spoke clamps $d$ connected by an intervening web $e$ and having projecting flanges $d, d$ at the ends. One of the spring seats is provided with an inwardly-projecting lip $f$ while the other seat has no lip. Hence when the ring sections are bolted together in staggered relation as shown in Fig. 1 the two half spring seats that go to make up one complete spring seat unit form a spring seat that has a ledge on one side for preventing the spring pulling out of the seat and is open on the other side. The same is true of the sections that go to make up the inner sectional ring. This is shown in Fig. 2. The heavy spiral spring $g$, as already explained, can be set in this seat and the flange that forms the outer boundary of the seat holds the spring from tipping laterally while the lips $f$ on two of the half spring seats serve to prevent the spring being pulled out of its seat by any unusual separating movement between the outer wheel section and the inner wheel section.

As already explained, the ring sections $c$ are bolted to the spoke ends and bolted to each other in staggered relation around the entire circumference of the wheel, forming in effect, two rings which define one the outer circumference of the inner wheel section and the other the inner circumference of the outer wheel section. Between these engage the springs $g$ which are held firmly in the spring seats by means of the encompassing flange and the under-engaging lip $f$. These seats are so calculated that they hold the springs firm enough so that the wheel may be driven through the effort communicated to the inner wheel section and the turning effort communicated from such section through the springs to the outer wheel section.

What I claim is:

1. A wheel provided with spokes divided between the felly and hub, a ring made up of a plurality of staggered sections bolted together and to the spoke portions of the outer wheel section and forming spring seats, a second ring made up of a plurality of sections in staggered relation bolted to each other and the portions of the spokes of the inner wheel section and formed to provide spring seats, and spiral springs spacing the two rings and engaging in the spring seats.

2. A wheel provided with spokes divided between the felly and the hub, a sectional ring made up of a plurality of sections each comprising a pair of half spring seats, and spoke clamps connected by a web and bolted together and to the spoke portions of the outer wheel section in staggered relation to form spring seats, a second sectional ring similarly constructed and secured to the inner wheel spoke portions, and springs spacing the two sectional rings and engaging in the spring seats.

3. A wheel provided with spokes divided between the hub and the felly, a sectional ring comprising a plurality of sections each made up of a pair of half spring seats, and spoke clamps connected by a web, one of the spring seats being provided with an under-engaging lip, the said sections being bolted together and in staggered relation and to the outer wheel spoke portions, an inner sectional ring similarly made up and secured to the spoke portions of the inner wheel section, and spiral springs engaging between the two sectional rings and held in the spring seats by the under-engaging lip of the spring seats engaging under the end coils to hold the spring from separation.

4. A wheel provided with spokes divided between the felly and the hub, a sectional ring formed of a plurality of sections each comprising a pair of half spring seats, and spoke clamps connected by a web and having projecting flanges at the ends, the said web and flanges being bolted together to arrange the sections in staggered relation while the half clamp portions are bolted through the ends of the spokes of the spoke portions of the outer wheel section, a ring for the inner wheel section secured to the spoke portions of the inner wheel section, and spiral springs spacing the two rings and engaging in the spring seats.

5. A wheel comprising spokes divided between the felly and the hub forming projecting spoke portions for two wheel sections outer and inner, two sectional rings provided with spring seats, the said ring sections being removably securable to the spoke portions of the outer and inner sections, and spiral springs spacing the two rings and engaging in the spring seats formed by the said two rings.

6. A wheel provided with spokes divided between the felly and the hub, a plurality of sections removably secured to each other and the spoke portions of the outer section to form a sectional ring provided with spring seats, a similar ring for engaging the spoke portions of the inner wheel section and forming spring seats, and springs spacing the two rings and engaging in the seats formed thereby.

In testimony whereof I affix my signature.

HARRY HAYMAN.